United States Patent
Kitahara et al.

(10) Patent No.: US 8,554,181 B2
(45) Date of Patent: Oct. 8, 2013

(54) DATA COMMUNICATION SYSTEM

(75) Inventors: Toshio Kitahara, Kobe (JP); Noriaki Inoue, Kobe (JP); Takako Fukuda, Kobe (JP); Masashi Tsuyunashi, Kobe (JP); Kentaro Koga, Kobe (JP); Satoru Ikeda, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 309 days.

(21) Appl. No.: 13/007,032

(22) Filed: Jan. 14, 2011

(65) Prior Publication Data
US 2011/0177795 A1    Jul. 21, 2011

(30) Foreign Application Priority Data

Jan. 19, 2010  (JP) ................................. 2010-008826

(51) Int. Cl.
*H04M 1/725* (2006.01)
*H04M 1/00* (2006.01)

(52) U.S. Cl.
USPC .................................... 455/412.1; 455/569.2

(58) Field of Classification Search
USPC ............. 455/412.1, 412.2, 511, 456.2, 569.2
See application file for complete search history.

(56) References Cited

U.S. PATENT DOCUMENTS

| | | | |
|---|---|---|---|
| 8,040,240 B2 * | 10/2011 | Khushu et al. ................ | 340/540 |
| 2007/0005368 A1 * | 1/2007 | Chutorash et al. ............ | 704/275 |
| 2009/0028306 A1 * | 1/2009 | Rhie .......................... | 379/93.01 |
| 2009/0083035 A1 * | 3/2009 | Huang et al. .................. | 704/260 |

FOREIGN PATENT DOCUMENTS

JP    A-2004-320163    11/2004

* cited by examiner

*Primary Examiner* — Nay A Maung
*Assistant Examiner* — Maryam Soltanzadeh
(74) *Attorney, Agent, or Firm* — Oliff & Berridge, PLC (57) ABSTRACT

A portable communication terminal transmits a request signal that requests voice data representing an email message, to a server apparatus when the portable communication terminal receives the email that has been sent to the portable communication terminal, and the portable communication terminal transmits the voice data received from the server apparatus, to an in-vehicle equipment. A server apparatus converts an email message that has been sent to a portable communication terminal, into voice data in response to a request signal received from the portable communication terminal, and the server apparatus returns the voice data to the portable communication terminal. The in-vehicle equipment detects a position of a portable communication terminal in a cabin, and the in-vehicle equipment outputs a voice message converted only from voice data representing an email message received by the portable communication terminal located in a specific position in the cabin, inside the cabin of the vehicle.

20 Claims, 9 Drawing Sheets

DATA COMMUNICATION SYSTEM

BACKGROUND OF THE INVENTION

1. Field of the Invention

The invention relates to technologies for outputting a voice message converted from voice data including an email message received by a portable communication terminal.

2. Description of the Background Art

Recently, data communication between portable communication terminals such as a mobile phone, a PDA (Personal Digital Assistant) and a laptop computer, or between communication terminals such as a personal computer is available. For example, the data communication includes email communication. An email is sent/received between those communication terminals through a communication network established by Internet service providers and telecommunication companies (carriers).

Before viewing an email received by a portable communication terminal, a user needs to run a special application for the email and to receive the email. Moreover, the user needs to carry out an operation for opening the email and to display the email message on a display screen of the portable communication terminal. The user cannot operate the portable communication terminal while the user is driving a vehicle, and therefore, the user cannot view the email message.

Not only a driver, but also a person who does a certain work in a cabin cannot view an email message received by his/her portable communication terminal.

In such a case, the following technology is disclosed: the technology that notifies a user who is driving a vehicle, of an email message received by a portable communication terminal, through voice to be output from an in-vehicle voice output apparatus (in-vehicle equipment).

However, inconveniences may occur if email messages received by all portable communication terminals are read out by an in-vehicle equipment when a plurality of persons who are carrying a portable communication terminal are in a vehicle.

In other words, there is a possibility that email messages received by portable communication terminals of other passengers are also read out even though it is sufficient that only an email message which is received by a portable communication terminal of a specific person who cannot check the email message because the person is working such as driving, is automatically read out by an in-vehicle equipment.

SUMMARY OF THE INVENTION

According to one aspect of this invention, a data communication system includes: an in-vehicle equipment for installation in a vehicle; a portable communication terminal configured to communicate with the in-vehicle equipment; and a server apparatus configured to communicate with the portable communication terminal. The portable communication terminal includes: a request unit that transmits a request signal requesting voice data representing an email message, to the server apparatus when the portable communication terminal receives an email that has been sent to the portable communication terminal; and a transmission unit that transmits the voice data received from the server apparatus, to the in-vehicle equipment. The server apparatus includes: a converter that converts the email message sent to the portable communication terminal, into the voice data in response to the request signal received from the portable communication terminal; and a return unit that returns the voice data to the portable communication terminal. The in-vehicle equipment includes: a voice output unit that outputs a voice message converted from the voice data received from the portable communication terminal, inside a cabin of the vehicle; a detector that detects a position of the portable communication terminal in the cabin; and a permission unit that permits outputting of the voice message converted only from the voice data representing the email message received by the portable communication terminal located in a specific position in the cabin, inside the cabin of the vehicle.

The in-vehicle equipment included in the data communication system detects the position of the portable communication terminal in the cabin. And then the in-vehicle equipment permits outputting of a voice message converted only from the voice data representing the email message received by the portable communication terminal located in the specific position in the cabin. Thereby the data communication system can automatically output the voice message only from the email message received by the specific portable communication terminal, through the in-vehicle equipment.

According to another aspect of this invention, an in-vehicle equipment for installation in a vehicle includes: an obtaining unit that obtains voice data representing an email message received by a portable communication terminal located in a cabin of the vehicle; a voice output unit that outputs a voice message converted from the voice data, inside the cabin of the vehicle; a detector that detects a position of the portable communication terminal in the cabin of the vehicle; and a permission unit that permits outputting of the voice message converted only from the voice data representing the email message received by the portable communication terminal located in a specific position in the cabin, inside the cabin of the vehicle.

The in-vehicle equipment detects the position of the portable communication terminal in the cabin. And then the in-vehicle equipment permits outputting of the voice message converted only from the voice data representing the email message received by the portable communication terminal located in the specific position in the cabin. Thereby the in-vehicle equipment can automatically output the voice message only from the email message received by the specific portable communication terminal.

According to another aspect of this invention, a data communication method uses an in-vehicle equipment for installation in a vehicle, a portable communication terminal configured to communicate with the in-vehicle equipment, and a server apparatus configured to communicate with the portable communication terminal. The data communication method includes the step (a) that the portable communication terminal transmits a request signal that requests voice data representing an email message, to the server apparatus when the portable communication terminal receives an email that has been sent to the portable communication terminal, the step (b) that the server apparatus converts the email message sent to the portable communication terminal, into the voice data in response to the request signal received from the portable communication terminal, the step (c) that the server apparatus returns the voice data to the portable communication terminal, the step (d) that the portable communication terminal transmits the voice data received from the server apparatus, to the in-vehicle equipment, the step (e) that the in-vehicle equipment outputs the voice message converted from the voice data received from the portable communication terminal, inside a cabin of the vehicle, the step (f) that the in-vehicle equipment detects a position of the portable communication terminal in the cabin, and the step (g) that the in-vehicle equipment permits outputting of the voice message converted only from the voice data representing the email message received by the portable communication terminal located in a specific position in the cabin, inside the cabin of the vehicle.

The data communication method includes the step that the in-vehicle equipment detects a position of a portable communication terminal in a cabin. And the data communication method includes the step that the in-vehicle equipment permits outputting of the voice message converted only from the voice data representing the email message received by the portable communication terminal located in the specific position in the cabin, inside the cabin of the vehicle. Thereby the data communication method can automatically output the voice message only from the email message received by the specific portable communication terminal, through the in-vehicle equipment.

Therefore, an object of the invention is to provide the technology that the in-vehicle equipment automatically outputs the voice message only from the email message received by the portable communication terminal of the specific person, inside the cabin of the vehicle.

These and other objects, features, aspects and advantages of the invention will become more apparent from the following detailed description of the invention when taken in conjunction with the accompanying drawings.

DESCRIPTION OF THE EMBODIMENTS

Embodiments of this invention are explained hereinbelow with reference to the attached drawings.

<Representative Embodiment>

(Data Communication System)

Figure 1:
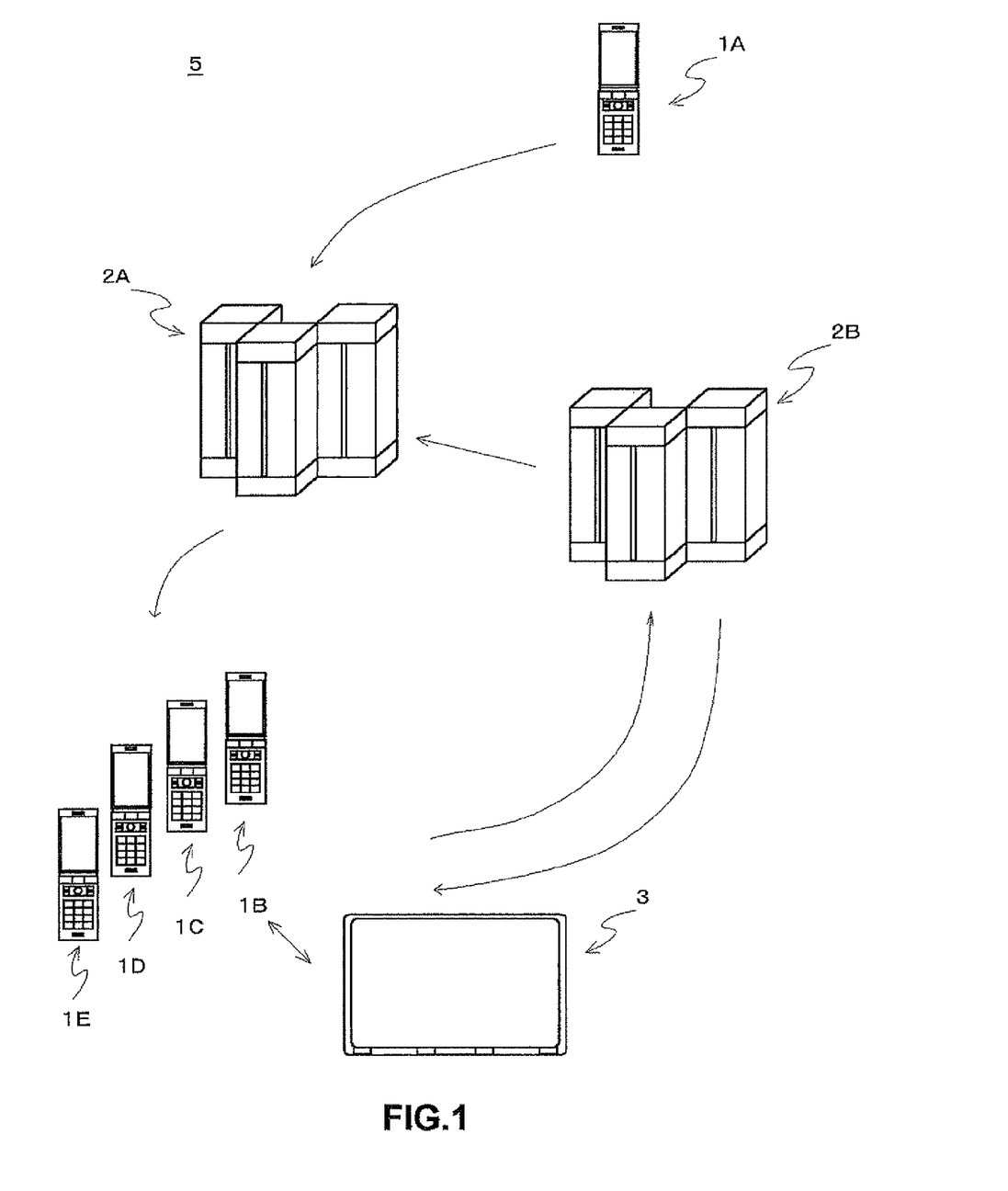
FIG. 1 shows a communication system including portable communication terminals, an in-vehicle equipment and servers.

A communication system including portable communication terminals, servers that can communicate with the portable communication terminals and an in-vehicle equipment installed in a vehicle that perform data communication is explained based on FIG. 1.

A communication system 5 of this embodiment includes portable communication terminals 1A, 1B, 1C, 1D and 1E, a carrier server 2A and a voice data server 213, an in-vehicle equipment 3 and the like.

The portable communication terminal 1A is, for example, a heretofore known mobile phone and has well-known functions such as a phone call function, an email communication function, an Internet browsing function and a music playback function. In addition, the portable communication terminal 1A has a voice data communication function to receive voice data from the voice data server 2B and a short-distance wireless communication function to perform the short-distance wireless communication with the in-vehicle equipment 3.

Short-distance wireless communication is, for example, communication based on Bluetooth (registered trademark) standard. The portable communication terminal 1A and the in-vehicle equipment 3 transmit/receive various data mutually through wireless communication in conformity with the Bluetooth standard. For this communication, it is acceptable to use communication based on another standard differing from the Bluetooth standard.

The portable communication terminals 1B, 1C, 1D and 1E have the same functions as the portable communication terminal 1A.

The carrier server 2A has functions such as an email communication function to send a received email to the address designated by the email, a format conversion function to convert the received email data into data in the format for a portable communication terminal, a webmail conversion function to convert the received email into a webmail, and a security function to prevent information leakage.

The voice data server 2B has functions such as a webmail obtaining function to obtain a webmail converted from an email received by the carrier server 2A, a voice data conversion function to convert the obtained webmail into voice data, and a voice data communication function to transmit the voice data to the portable communication terminals 1B, 1C, 1D and 1E.

The in-vehicle equipment 3 has functions such as a short-distance wireless communication function to perform short-distance wireless communication with the portable communication terminals 1B, 1C, 1D and 1E, an audio function to play back a CD, a broadcasting data reception function to receive broadcasting data such as a television, and a display function to display the broadcasting data and the like in an operating/display part.

The in-vehicle equipment 3 can incorporate sophisticated functions such as a navigation function and a visual audio function to play back a DVD and a Blu-ray Disk.

In addition, the in-vehicle equipment 3 has functions such as a detection function of the portable communication terminal position to detect where a portable communication terminal is located in a cabin and a voice data output permission function to permit an "email readout service" only for the portable communication terminal located in a specific position. These functions are mentioned later. The "email readout service" refers to the after-mentioned control performed by the communication system 5 in FIG. 6.

(Portable Communication Terminal System)

Figure 2:
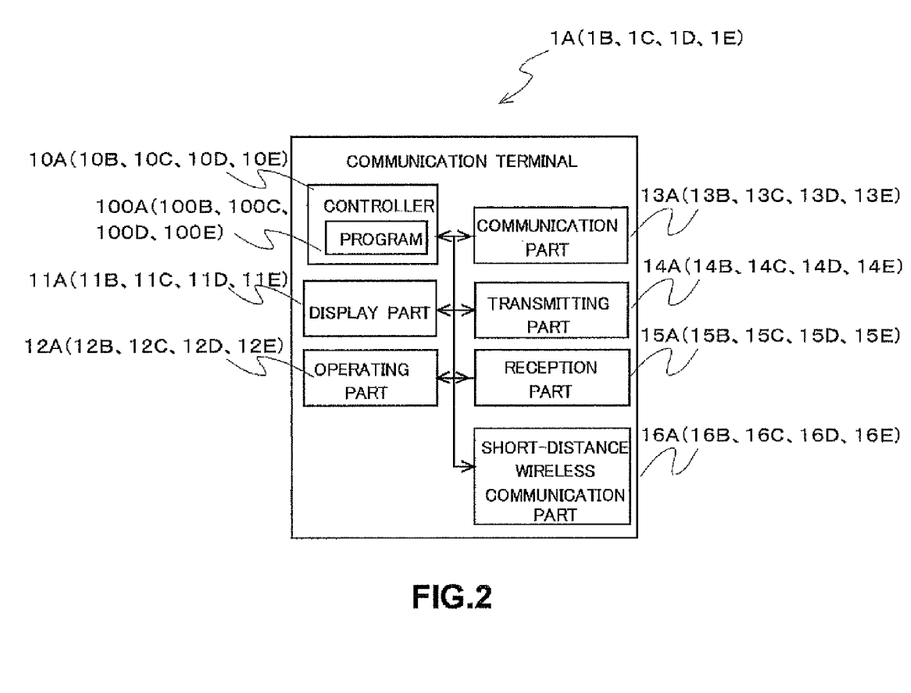
FIG. 2 is a system block diagram of a portable communication terminal.

A system of the portable communication terminal 1A is explained based on FIG. 2.

The portable communication terminal 1A includes a controller 10A, a display part 11A, an operating part 12A, a communication part 13A, a transmitting part 14A, a reception part 15A, a short-distance wireless communication part 16A and the like.

The controller 10A is, for example, a microcomputer including a CPU, a RAM, a ROM and the like. The microcomputer fulfills the above-mentioned various functions by arithmetic processing of the CPU in accordance with a program 100A stored in the ROM in advance. The display part 11A is, for example, a liquid crystal display apparatus to display information controlled by the controller 10A. The operating part 12A is, for example, a push button to accept and transmit operation details of a user to the controller 10A. The communication part 13A performs email communication with another portable communication terminal through the carrier server 2A, performs phone call communication with another portable communication terminal and the like, and performs voice data communication with the voice data server 2B. The transmitting part 14A inputs voice to be transmitted to the other person when the communication part 13A performs phone call communication. The reception part 15A outputs the other person's voice when the communication part 13A performs phone call communication. The short-distance wireless communication part 16A performs the above-mentioned short-distance wireless communication with the in-vehicle equipment 3.

Explanation of each system block of the portable communication terminals 1B, 1C, 1D and 1E is omitted as their system blocks are the same as that of the portable communication terminal 1A. As for a symbol to be assigned to each part of the system block of the portable communication terminals 1B, 1C, 1D and 1E, an alphabet B, C, D, and E are put instead of an alphabet A that is put after a numeric character assigned for each part of the system block of the portable communication terminal 1A.

(Carrier Server System)

Figure 3:
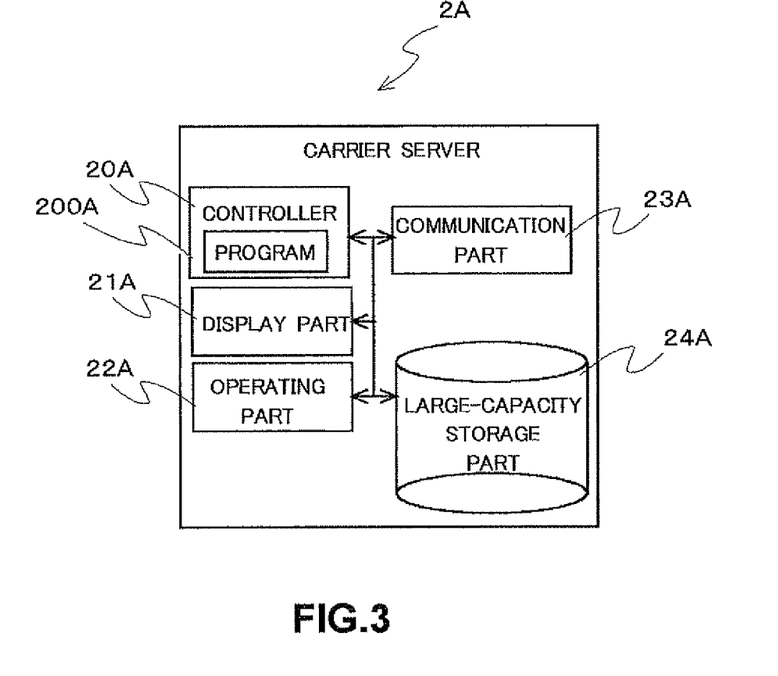
FIG. 3 is a system block diagram of a carrier server.

A system of the carrier server 2A is explained based on FIG. 3.

The carrier server 2A includes a controller 20A, a display part 21A, an operating part 22A, a communication part 23A and a large-capacity storage part 24A.

The controller 20A is, for example, a microcomputer including a CPU, a RAM, a ROM and the like. The microcomputer fulfills various functions by arithmetic processing of the CPU in accordance with a program 200A stored in the ROM in advance. The display part 21A is, for example, a liquid crystal display apparatus to display information controlled by the controller 20A. The operating part 22A is, for example, a keyboard to accept and transmit operation details of a user to the controller 20A. The communication part 23A performs data communication to send an email to the portable communication terminal designated by the email received from a certain portable communication terminal. The large-capacity storage part 24A is, for example, a hard disk to accumulate data required for fulfilling various functions. The accumulated data is, for example, a user's email address and the like to be registered in a service provided by the carrier server 2A.

(Voice Data Server System)

Figure 4:
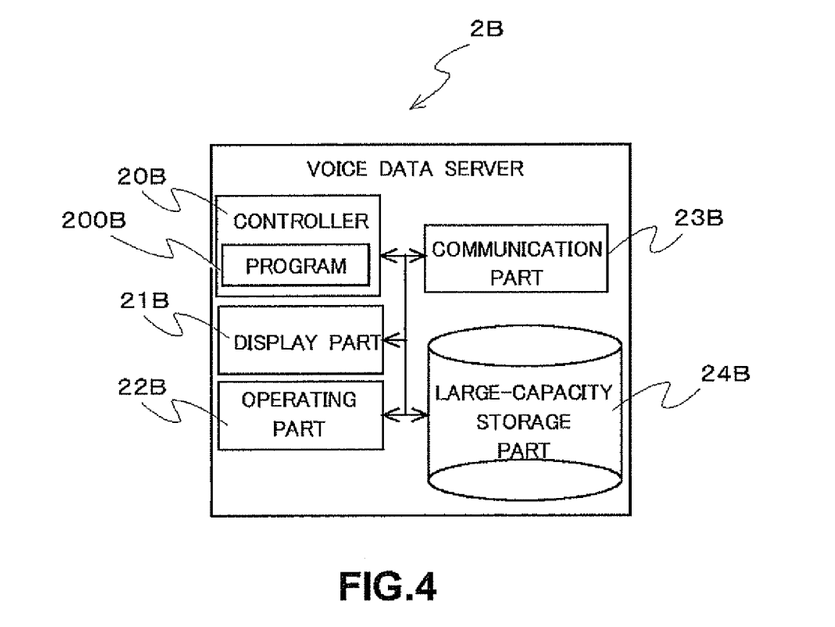
FIG. 4 is a system block diagram of a voice data server.

A system of the voice data server 2B is explained based on FIG. 4.

The voice data server 2B includes a controller 20B, a display part 21B, an operating part 22B, a communication part 23B and a large-capacity storage part 2413.

The controller 20B is, for example, a microcomputer including a CPU, a RAM, a ROM and the like. The microcomputer fulfills the above-mentioned various functions by arithmetic processing of the CPU in accordance with a program 200B stored in the ROM in advance. The display part 21B is, for example, a liquid crystal display apparatus to display information controlled by the controller 2013. The operating part 22B is, for example, a keyboard to accept and transmit operation details of a user to the controller 20B. The communication part 23B receives a request signal that requests voice data representing the email message received by the portable communication terminal 113, from the portable communication terminal 1B. And then the communication part 2313 performs data communication to transmit voice data converted by the controller 20B based on a web-mail message obtained from the carrier server 2A in response to the request signal, to the portable communication terminal 18. The large-capacity storage part 24B, for example, includes a hard disk and accumulates data required for fulfilling various functions. For example, the large-capacity storage part 24B accumulates voice data corresponding to characters included in text data such as a webmail.

(In-Vehicle Equipment System)

Figure 5:
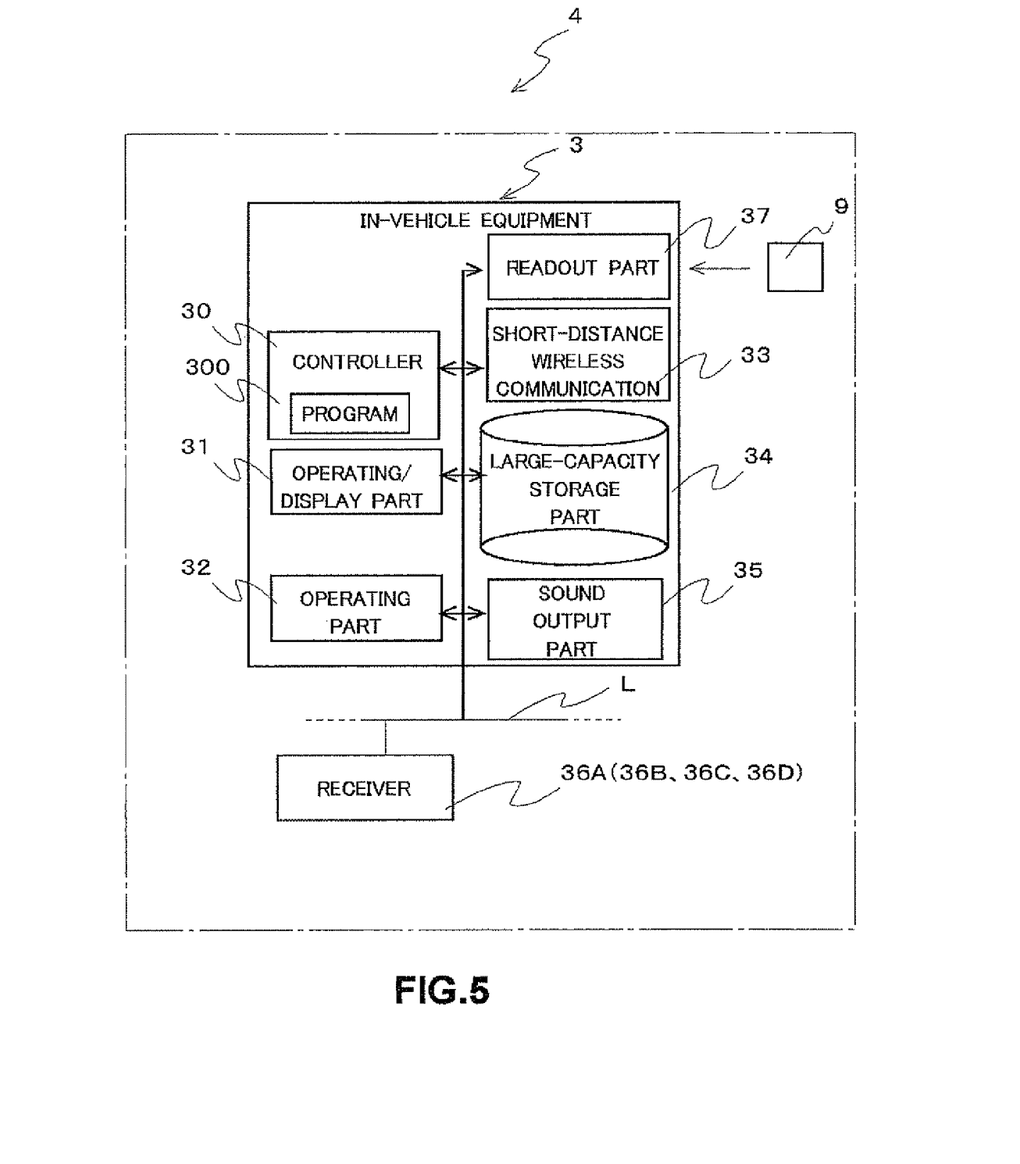
FIG. 5 is a system block diagram of an in-vehicle equipment.

A system of the in-vehicle equipment 3 is explained based on FIG. 5.

The in-vehicle equipment 3 is, for example, installed in a vehicle 4 with an engine. The in-vehicle equipment 3 can be installed in an electric car and a hybrid car with an electric motor for running.

The in-vehicle equipment 3 includes a controller 30, an operating/display part 31, an operating part 32, a short-distance wireless communication part 33, a large-capacity storage part 34, a sound output part 35, a readout part 37 and the like.

The controller 30 is, for example, a microcomputer including a CPU, a RAM, a ROM and the like. The microcomputer fulfills the above-mentioned various functions by arithmetic processing of the CPU in accordance with a program 300 stored in the ROM in advance. The program 300 is obtained through the readout part 37 reading out a memory card 9 that is a non-transitory computer-readable recording medium in which the program is stored. The operating/display part 31, for example, includes display with a touch-screen function to display information controlled by the controller 30 and to accept and transmit operation details of a user to the controller 30. The operating part 32 is, for example, a push button to accept and transmit operation details of a user to the controller 30. The short-distance wireless communication part 33 performs the above-mentioned short-distance wireless communication with the portable communication terminals 1B, 1C, 1D and 1E. The large-capacity storage part 34, for example, accumulates data such as a music, an image, a moving image, a map. The sound output part 35, for example, outputs sounds for when the controller 30 fulfills an audio function to play back a CD, a broadcasting data reception function to receive broadcasting data such as a radio and a television, and other functions. In addition, the sound output part 35 outputs a voice message converted from voice data received from the short-distance wireless communication part.

(Communication System Control)

Figure 6:
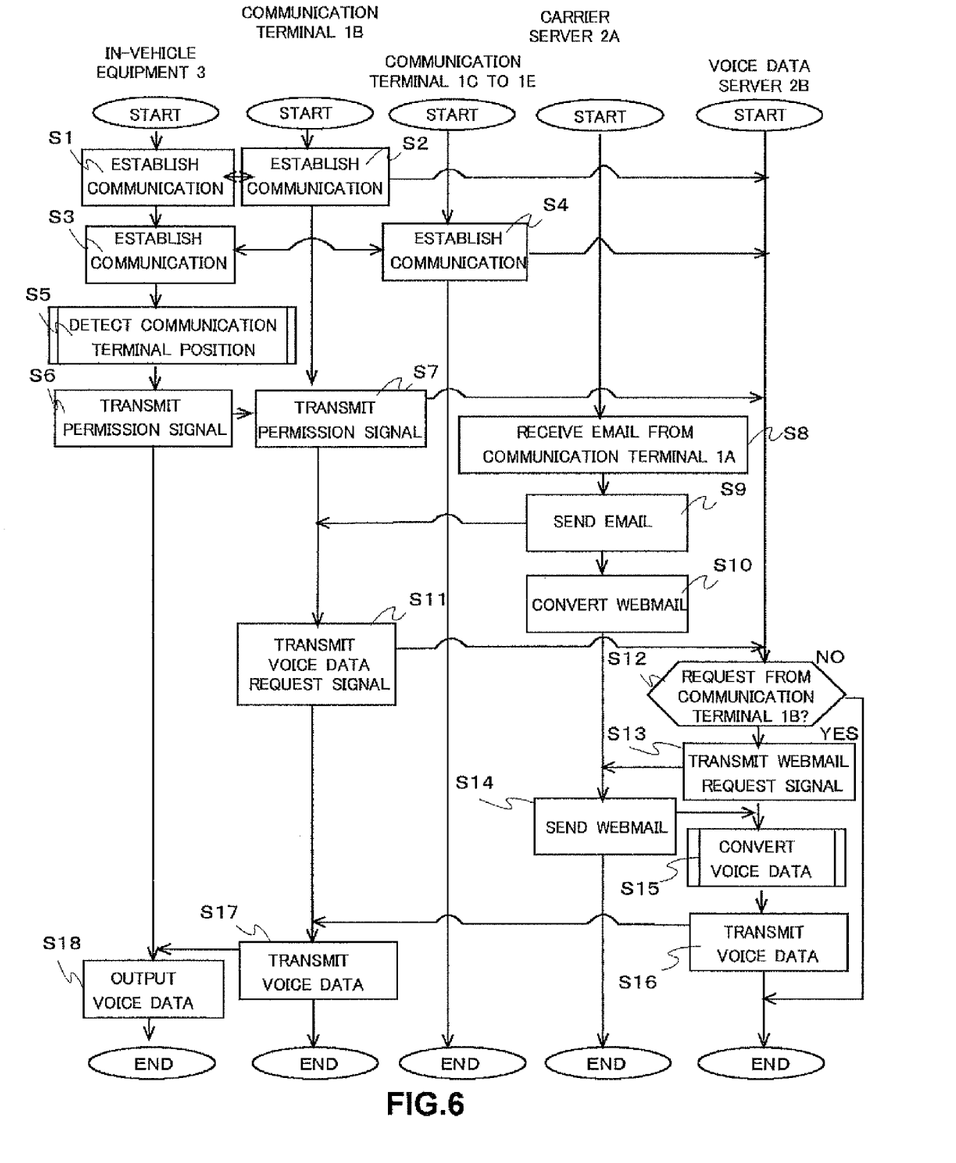
FIG. 6 is a flow chart of a communication system.

The communication system 5 of this embodiment is explained based on FIG. 6.

First, in step S1, the in-vehicle equipment 3 performs a pairing control to establish short-distance wireless communication with the portable communication terminal 1B.

In step S2, the portable communication terminal 1B performs a pairing control to establish short-distance wireless communication with the in-vehicle equipment 3.

In step S3, the in-vehicle equipment 3 performs a pairing control to establish short-distance wireless communication with the portable communication terminals 1C, 1D and 1E respectively.

In step S4, the portable communication terminals 1C, 1D and 1E perform a pairing control to establish short-distance wireless communication with the in-vehicle equipment 3.

In step S5, the controller 30 in the in-vehicle equipment 3 implements a detection process of a portable communication terminal position. The detection process of the portable communication terminal position refers to the process to detect the portable communication terminal 1B located in a specific position in a cabin (e.g. in a driver's seat area) based on the function (hereinafter, referred to as a detection function) to detect an existence of the portable communication terminal in the cabin and the short-distance wireless communication function. Hereinbelow, detailed explanations of the detection function are given based on FIG. 7.

Figure 7:
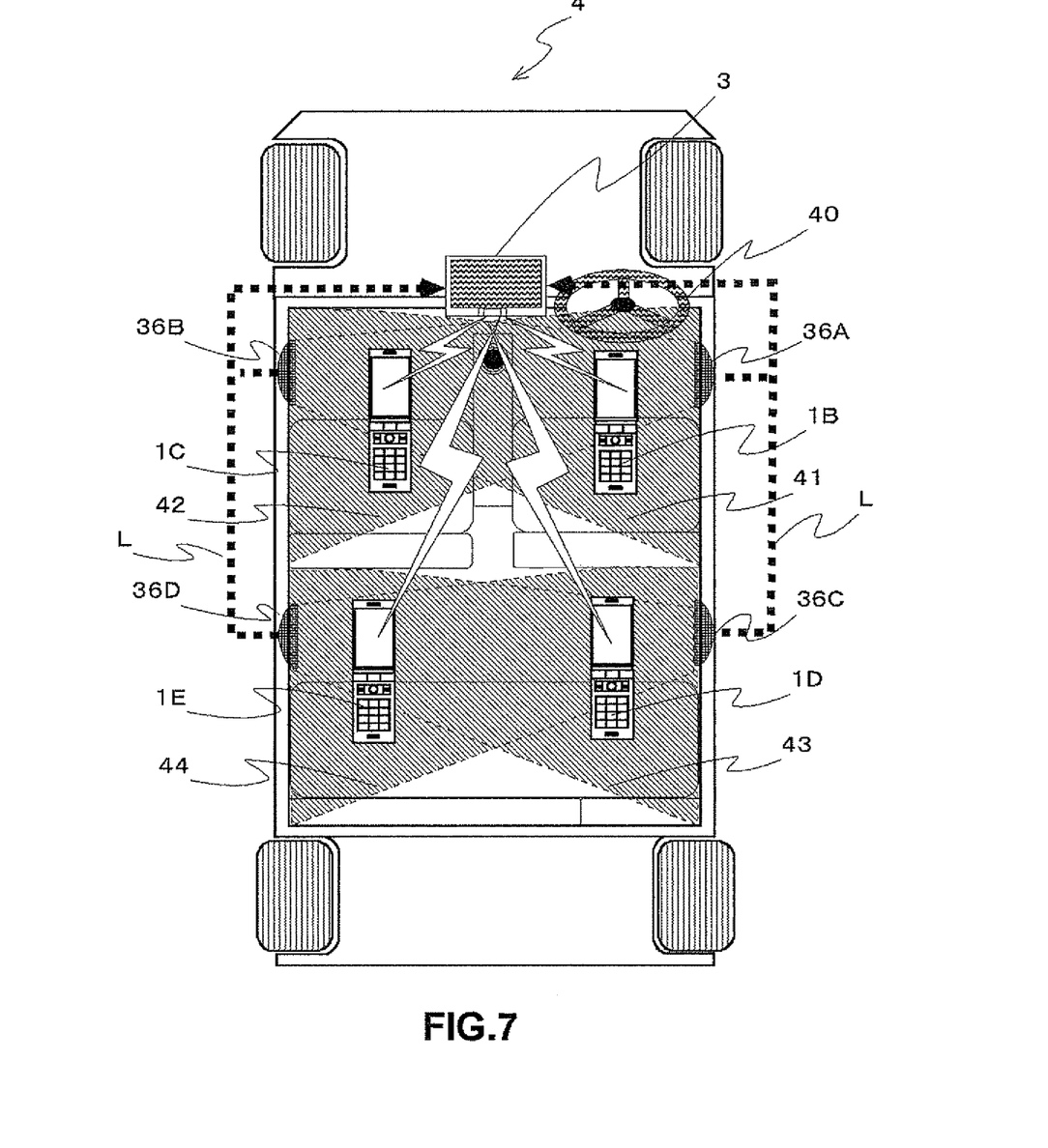
FIG. 7 shows a detection system of a portable communication terminal position in a cabin.

The vehicle 4 includes receivers 36A, 36B, 36C and 36D that detect electric field intensity of a radio wave generated when a portable communication terminal performs communication. These receivers and the in-vehicle equipment 3 are connected through an in-vehicle network L. A signal detected by the receiver is transmitted to the in-vehicle equipment 3 through the in-vehicle network L.

The receiver 36A is installed near a driver's seat area 41 of the vehicle 4. The receiver 36B is installed near a front passenger seat area 42 of the vehicle 4. The receiver 36C is installed near a rear seat area 43 on the driver's seat side of the vehicle 4. The receiver 36D is installed near a rear seat area 44 on the passenger seat side of the vehicle 4.

The controller 30 in the in-vehicle equipment 3 starts communication with the portable communication terminals 1B, 1C, 1D and 1E located in the cabin of the vehicle 4, through short-distance wireless communication. The controller 30 in the in-vehicle equipment 3 receives a signal indicating electric field intensity from the receivers 36A, 36B, 36C and 36D respectively through the in-vehicle network L when the controller 30 in the in-vehicle equipment 3 transmits/receives test data and the like. When the received signal indicates a value of more than or equal to a first threshold value, the controller 30 in the in-vehicle equipment 3 detects an existence of the portable communication terminal in the near area where each receiver is installed.

A signal that the in-vehicle equipment 3 receives through short-distance wireless communication includes identifiers such as MAC address (Media Access Control Address) specific to each portable communication terminal 1B, 1C, 1D and 1E. Based on the received signal, the controller 30 in the in-vehicle equipment 3 recognizes that a portable communication terminal having the obtained identifier is located in any of the areas 41, 42, 43, or 44.

A concrete explanation is given as follows: the controller 30 in the in-vehicle equipment 3 obtains identifier for each portable communication terminal 113 to 1E by performing short-distance wireless communication. And then the controller 30 in the in-vehicle equipment 3 receives a signal indicating electric field intensity from the receivers 36A, 36B, 36C and 36D respectively every time the controller 30 in the in-vehicle equipment 3 performs communication. When the received signal indicates a value of more than or equal to a first threshold value, the controller 30 in the in-vehicle equipment 3 recognizes that a portable communication terminal having the identifier is located in the area near where the receiver is installed.

Thereby, in the next step, the controller 30 in the in-vehicle equipment 3 can provide an "email readout service" only for the portable communication terminal 1B having the identifier and located in the driver's seat area 41.

A driver's seat is set as a specific area by default. However, a user can set an area other than the driver's seat as the specific area in the operating/display part 31 in the in-vehicle equipment 3. Thereby it is possible to provide an "email readout service" only for a portable communication terminal of a passenger in a specific area set by the user discretionarily.

In step S6, the controller 30 in the in-vehicle equipment 3 outputs a voice message converted from voice data representing an email message only for the portable communication terminal 1B located in the driver's seat area 41, from the sound output part 35. Thus the controller 30 transmits a permission signal only to the portable communication terminal 1B.

In step S7, the portable communication terminal 1B transfers (transmits) a permission signal received from the in-vehicle equipment 3, to the voice data server 2B.

Based on the permission signal, a subsequent process is implemented and an "email readout service" is provided only for a portable communication terminal located in a specific area, for example, in a driver's seat area amongst a plurality of portable communication terminals. Thereby a user who is driving a vehicle can check an email message received by the user's portable communication terminal without an operation of the portable communication terminal to check the email message. Moreover it is possible to avoid a situation that an email message received by a portable communication terminal of a passenger is read out by the "email readout service."

In step S8, the carrier server 2A receives an email from the portable communication terminal 1A. The carrier server 2A converts the received email into data in a format conforming to a rule of the portable communication terminal 1B.

In step S9, the carrier server 2A transmits the converted data to the portable communication terminal 113 whose address is shown in the received email.

In step S10, the carrier server 2A converts the received email into a webmail.

A webmail is an email service in which a portable communication terminal connected to Internet receives, sends and views an email through a web browser. Therefore, the email can be utilized without an application for the email if the web browser is installed in the portable communication terminal and the email is converted into the webmail.

In step S11, the portable communication terminal 1B transmits a request signal that requests voice data to the voice data server 2B In step S12, the voice data server 2B judges whether a portable communication terminal that transmitted a voice data request signal is permitted to receive an "email readout service" when the voice data server 2B received the voice data request signal from the portable communication terminal 1B. In other words, the voice data server 2B judges whether the voice data request signal was received from the portable communication terminal 1B to which the in-vehicle equipment 3 transmitted a permission signal.

When the voice data server 2B judges that a voice data request signal was received from the portable communication terminal 1B to which the in-vehicle equipment 3 transmitted a permission signal, a step moves on to step S13. When the voice data server 2B does not judge that a voice data request signal was received from the portable communication terminal 1B to which the in-vehicle equipment 3 transmitted a permission signal, the voice data server 2B terminates this control.

In the step S13, after receiving a voice data request signal from the portable communication terminal 1B, the voice data server 2B transmits the request signal that requests a webmail to the carrier server 2A.

In step S14, after receiving a webmail request signal from the voice data server 2B, the carrier server 2A sends the webmail to the voice data server 2B. After that, the carrier server 2A terminates this control.

In step S15, the voice data server 2B implements a process (hereinafter, referred to as a voice data conversion process) to convert the webmail message received from the carrier server 2A into voice data.

The voice data conversion process of the voice data server 2B is implemented by searching and extracting voice data suitable for character data included in a webmail from the large-capacity storage part 24B in which the voice data is accumulated.

In step S16, the voice data server 2B transmits the converted voice data to the portable communication terminal 1B. After that, the voice data server 2B terminates this control.

In step S17, the portable communication terminal 1B transfers (transmits) the received voice data to the in-vehicle equipment 3 through short-distance wireless communication. In other words, the portable communication terminal 1B functions as a relay equipment to relay the voice data received from the voice data server 2B to the in-vehicle equipment 3 without processing such as data processing. Therefore, the process of a main function such as a phone call function included in the portable communication terminal 1B is not affected. After that, the portable communication terminal 1B terminates this control.

In step S18, the controller 30 in the in-vehicle equipment 3 outputs the voice data received through short-distance wireless communication, from the sound output part 35. After that, the controller 30 terminates this control.

In a portable communication terminal, it is not possible to transfer an email to another apparatus or to transfer text data generated by copying the email, to another apparatus, from a viewpoint of security such as a prevention of information leakage.

Therefore, the carrier server 2A with enhanced security functions converts an email into a webmail. The voice data server 2B with enhanced security functions obtains the webmail and converts it into voice data. And then the voice data server 2B transmits the voice data to the in-vehicle equipment 3 through the portable communication terminal 1B. The in-vehicle equipment 3 outputs a voice message converted from the voice data of the email message.

Thereby, the communication system 5 can maintain security in a portable communication terminal and can automatically output the voice message converted from the voice data of the email message in the in-vehicle equipment.

Furthermore, a configuration to provide an "email readout service" only for a portable communication terminal located in a specific area, for example, in a driver's seat area amongst a plurality of portable communication terminals allows a user, who is driving a vehicle, to check an email message received by the user's portable communication terminal without an operation of the portable communication terminal to check the email message. Moreover, it is possible to avoid a situation that an email message received by a portable communication terminal of a passenger in the vehicle 4 is read out by the "email readout service."

The embodiments in the invention have been described so far. The invention is not limited to the above embodiments but possible to be applied to various embodiments. Hereinbelow, other embodiments are explained. Of course, the embodiments to be explained below can be arbitrarily combined with one or more of the others.

MODIFICATION EXAMPLES 1

Figure 8:
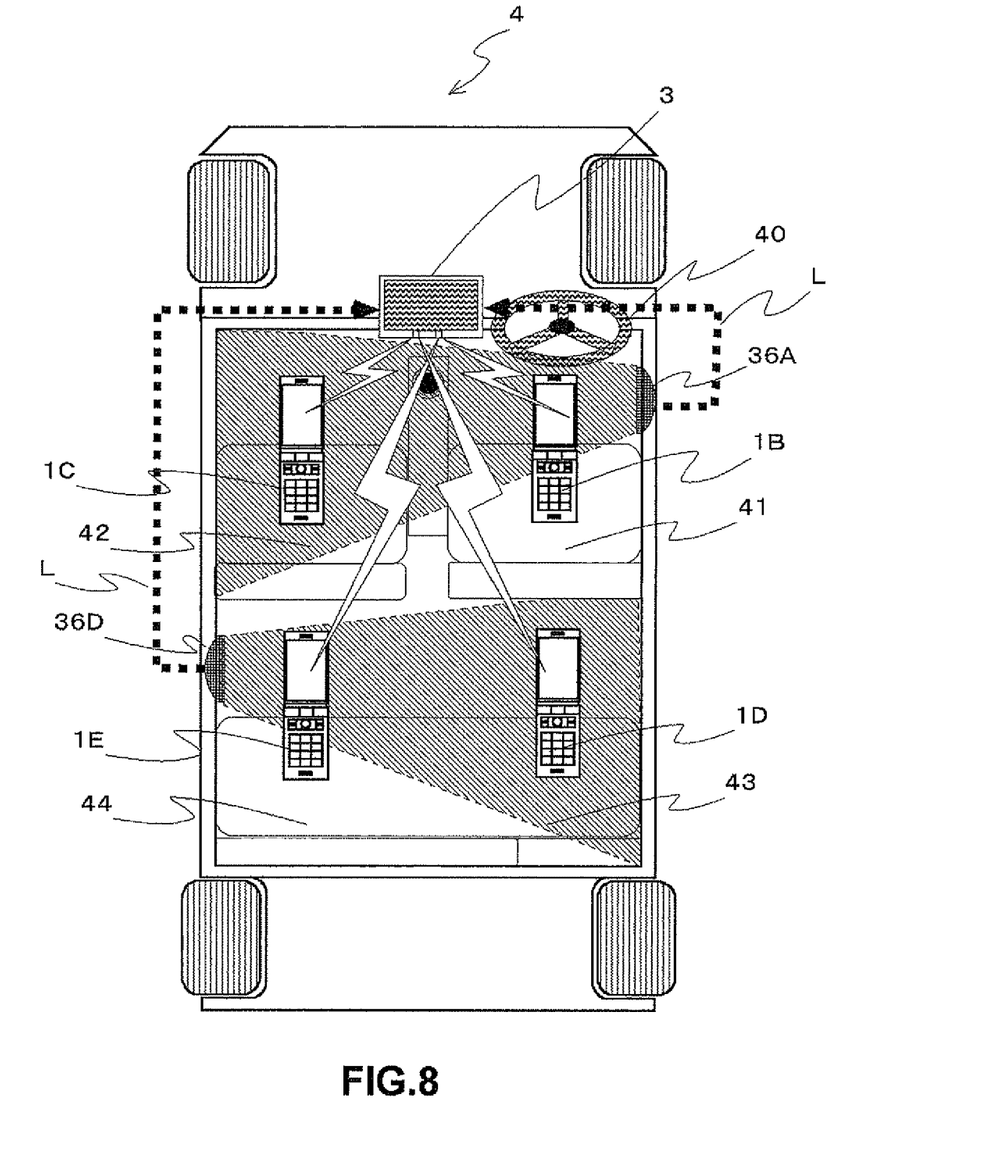
FIG. 8 shows a detection system of a portable communication terminal position in a cabin.

In the representative embodiment described above, the explanation is given as follows: the detection process of the portable communication terminal position in the step S5 is implemented based on the receivers 36A, 36B, 36C and 36D installed in the vehicle 4. However, as shown in FIG. 8, it is acceptable to implement the detection process of the portable communication terminal position based on only two receivers: the receiver 36A installed near the driver's seat area 41 and the receiver 36D installed near the rear seat area 44 on the passenger seat side.

The details of the detection process of the portable communication terminal position implemented by the in-vehicle equipment 3 are explained with reference to FIG. 8.

The receiver 36A, the receiver 36D and the controller 30 in the in-vehicle equipment 3 are connected with the in-vehicle network L. A signal detected by those receivers is transmitted to the in-vehicle equipment 3 through the in-vehicle network L.

The receiver 36A is installed near the driver's seat area 41 of the vehicle 4 and the receiver 36A can detect electric field intensity of a radio wave generated in the driver's seat area 41 and the front passenger seat area 42. The receiver 36D is installed near the rear seat area 44 on the passenger seat side and the receiver 36D can detect electric field intensity of a radio wave generated in the rear seat area 43 on the driver's seat side and the rear seat area 44 on the passenger seat side.

The controller 30 in the in-vehicle equipment 3 starts communication with the portable communication terminals 1B, 1C, 1D and 1E located in the cabin of the vehicle 4, through short-distance wireless communication. When transmitting/receiving test data and the like, the controller 30 in the in-vehicle equipment 3 receives a signal indicating electric field intensity from the receiver 36A, through the in-vehicle network L. When the received signal indicates a value of more than or equal to a second threshold value, the controller 30 in the in-vehicle equipment 3 judges that the portable communication terminal 1B is located in the driver's seat area 41. When the received signal indicates a value of more than or equal to a third threshold value which is less than the second threshold value, and indicates a value of less than the second threshold value, the controller 30 in the in-vehicle equipment 3 judges that the portable communication terminal 1C is located in the front passenger seat area 42. Moreover, when a signal received by the receiver 36D indicates a value of more than or equal to a fourth threshold value, the controller 30 in the in-vehicle equipment 3 judges that the portable communication terminal 1E is located in the rear seat area 44 on the passenger seat side. When the received signal indicates a value of more than or equal to a fifth threshold value which is less than the fourth threshold value, and indicates a value of less than the fourth threshold value, the controller 30 in the in-vehicle equipment 3 judges that the portable communication terminal 1D is located in the rear seat area 43 on the driver's seat side.

A signal that the controller 30 in the in-vehicle equipment 3 receives through short-distance wireless communication includes identifiers such as MAC address specific to each portable communication terminal 1B, 1C, 1D and 1E. The controller 30 in the in-vehicle equipment 3 recognizes which area amongst 41, 42, 43, or 44 the portable communication terminal having the obtained identifier is located.

A concrete explanation is given as follows: the controller 30 in the in-vehicle equipment 3 obtains identifiers for each portable communication terminal 1B to 1E by performing short-distance wireless communication. And then the controller 30 in the in-vehicle equipment 3 receives signals indicating electric field intensity from the receivers 36A and 36D every time the controller 30 in the in-vehicle equipment 3 performs communication. When a signal received by the receiver 36A indicates a value of more than or equal to a second threshold value, the controller 30 in the in-vehicle equipment 3 recognizes that the portable communication terminal 1B having the obtained identifier is located in the driver's seat area 41. When the received signal indicates a value of more than or equal to a third threshold value which is less than the second threshold value, and indicates a value of less than the second threshold value, the controller 30 in the in-vehicle equipment 3 recognizes that the portable communication terminal 1C having the obtained identifier is located in the front passenger seat area 42. Moreover, when a signal received by the receiver 36D indicates a value of more than or equal to a fourth threshold value, the controller 30 in the in-vehicle equipment 3 recognizes that the portable communication terminal 1E having the obtained identifier is located in the rear seat area 44 on the passenger seat side. When the received signal indicates a value of more than or equal to a fifth threshold value which is less than the fourth threshold value, and indicates a value of less than the fourth threshold value, the controller 30 in the in-vehicle equipment 3 recognizes that the portable communication terminal 1D having the obtained identifier is located in the rear seat area 43 on the driver's seat side.

Thereby the controller 30 in the in-vehicle equipment 3 can provide an "email readout service" only for the portable communication terminal 1B having the identifier and located in the driver's seat area 41.

MODIFICATION EXAMPLES 2

Figure 9:
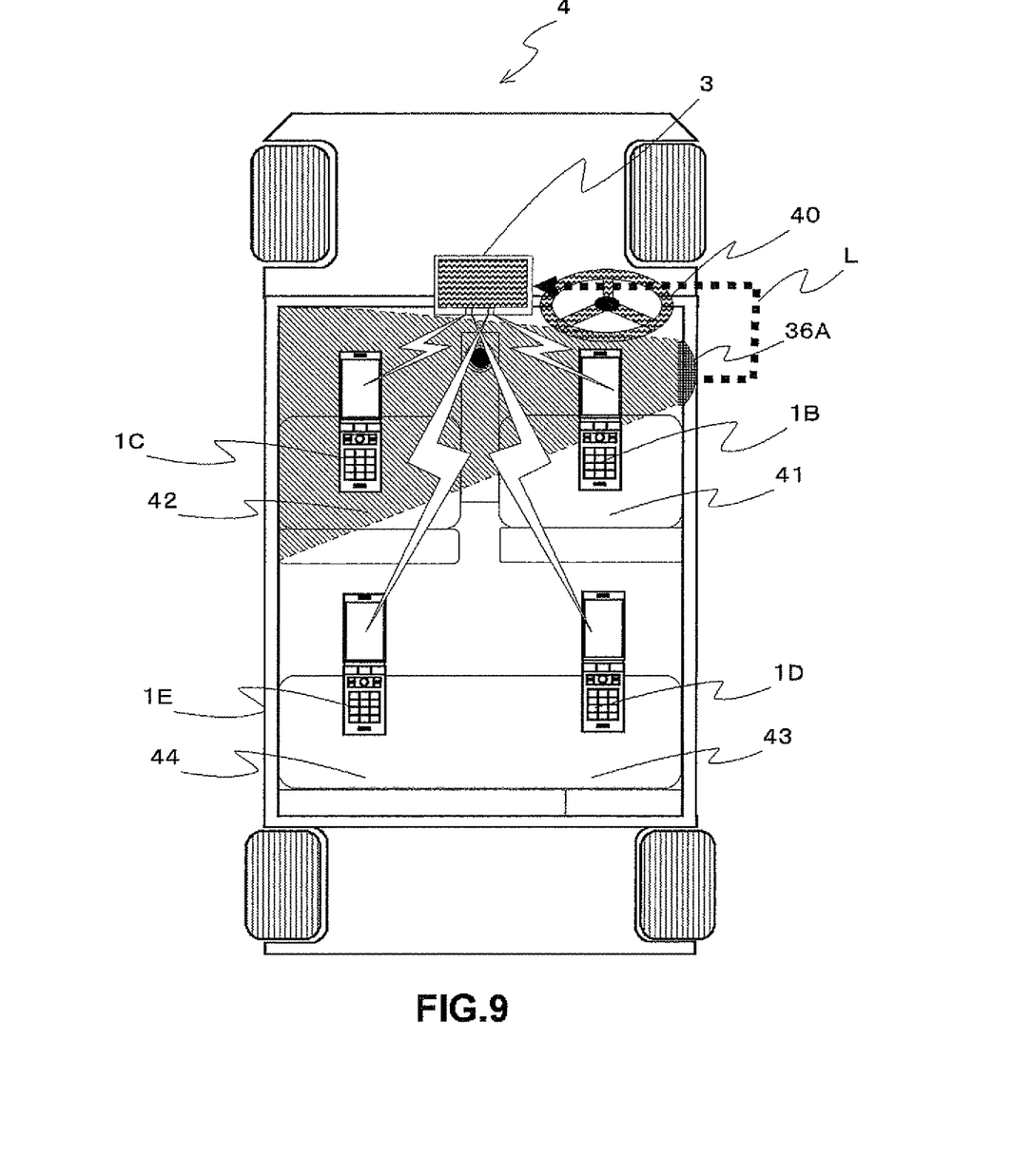
FIG. 9 shows a detection system of a portable communication terminal position in a cabin.

In the representative embodiment described above, the explanation is given as follows: the detection process of the portable communication terminal position in the step S5 is implemented based on the receivers 36A, 36B, 36C and 36D that are installed in the vehicle 4 and detect electric field intensity of the radio wave generated when the portable communication performs the communication. However, as shown in FIG. 9, it is acceptable to implement the detection process of the portable communication terminal position based on only the receiver 36A installed near the driver's seat area 41.

The details of the detection process of the portable communication terminal position implemented by the in-vehicle equipment 3 are explained with reference to FIG. 9.

The receiver 36A and the in-vehicle equipment 3 are connected with the in-vehicle network L. A signal detected by the receiver is transmitted to the in-vehicle equipment 3 through the in-vehicle network L.

The receiver 36A is installed near the driver's seat area 41 of the vehicle 4 and the receiver 36A can detect electric field intensity of a radio wave generated in the driver's seat area 41 and the front passenger seat area 42.

The controller 30 in the in-vehicle equipment 3 starts communication with the portable communication terminals 1B, 1C, 1D and 1E located in the cabin of the vehicle 4, through short-distance wireless communication. When transmitting/receiving test data and the like, the controller 30 in the in-vehicle equipment 3 receives a signal indicating electric field intensity from the receiver 36A, through the in-vehicle network L. When the received signal indicating a value of more than or equal to a first threshold value, the controller 30 in the in-vehicle equipment 3 judges that the portable communication terminal 1B is located in the driver's seat area 41.

A signal that the in-vehicle equipment 3 receives through short-distance wireless communication includes identifiers such as MAC address specific to each portable communication terminal 1B, 1C, 1D and 1E. The controller 30 in the in-vehicle equipment 3 recognizes that a portable communication terminal having the obtained identifier is located in the driver's seat area 41.

A concrete explanation is given as follows: the controller 30 in the in-vehicle equipment 3 obtains identifiers for each portable communication terminal 1B to 1E by performing short-distance wireless communication. And then the controller 30 in the in-vehicle equipment 3 receives a signal indicating electric field intensity from the receiver 36A every time the controller 30 in the in-vehicle equipment 3 performs communication. When the received signal indicates a value of more than or equal to a first threshold value, the controller 30 in the in-vehicle equipment 3 recognizes that the portable communication terminal 1B having the obtained identifier is located in the area 41.

Thereby the controller 30 in the in-vehicle equipment 3 can provide an "email readout service" only for the portable communication terminal 1B having the identifier and located in the driver's seat area 41.

MODIFICATION EXAMPLES 3

In the representative embodiment described above, the explanation is given as follows: in the step S6 shown in FIG. 6, the in-vehicle equipment 3 transmits the permission signal to the voice data server 2B to permit the "email readout service" only for the portable communication terminal located in the specific position, and in the step S12, the voice data server 2B transmits the voice data only to the portable communication terminal designated by the received permission signal. However, it is acceptable that controls of the step S6, the step S7 and the step S12 are omitted in the voice data server 2B and that the in-vehicle equipment 3 permits a voice output only for a portable communication terminal located in a specific area in the step S18.

MODIFICATION EXAMPLES 4

In the representative embodiment described above, the explanation is given as follows: in the step S6 shown in FIG. 6, the in-vehicle equipment 3 transmits the permission signal to the voice data server 2B to permit the "email readout service" only for the portable communication terminal located in the specific position, and in the step S12, the voice data server 2B transmits the voice data only to the portable communication terminal designated by the received permission signal. However, it is acceptable that controls of the step S7 and the step S12 are omitted in the voice data server 2B and that a controller of a portable communication terminal permits a voice output only for a portable communication terminal located in a specific area through the following control in step S11: the controller of the portable communication terminal judges whether it received a permission signal. Only when the controller of the portable communication terminal judges that it received the permission signal, it transmits a voice data request signal. On the other hand, when the controller of the portable communication terminal does not judge that it received the permission signal, it does not transmit the voice data request signal.

MODIFICATION EXAMPLES 5

In the representative embodiment described above, the explanation is given as follows: in the step S10 shown in FIG. 6, the carrier server 2A converts the email received by the portable communication terminal 1B located in the specific area, into the webmail. In the step S14, the carrier server 2A transmits the converted webmail to the voice data server 2B. In the step S15, the voice data server 2B converts the received webmail into the voice data. In the step S16, the voice data server 2B transmits the converted voice data to the portable communication terminal 1B. In the step S17, the portable communication terminal 1B transfers (transmits) the voice data to the in-vehicle equipment 3. However, in this case, all email messages received by the portable communication terminal 1B located in the specific area are also known to other passengers in the vehicle 4 through a voice output in the in-vehicle equipment 3. On the other hand, an email message in need of urgent notification and the email message to be notified emergently are hoped to be notified through the voice output in the in-vehicle equipment 3 even if the messages are known to other passengers.

Therefore, after receiving the webmail, the voice data server 2B may implement the step S15 or after steps only when the data showing the urgency and the emergency is included in the webmail.

Thereby, a user can keep his/her personal message unknown to other passengers in the vehicle 4 and can check a message that the user hopes to receive notification urgently and emergently.

In the embodiments described above, various functions are implemented by software as a result of performance of arithmetic processing of the CPU in accordance with the program. However, a part of the functions may be implemented by an electrical hardware circuit.

While the invention has been shown and described in detail, the foregoing description is in all aspects illustrative and not restrictive. It is therefore understood that numerous other modifications and variations can be devised without departing from the scope of the invention.

What is claimed is:

1. A data communication system, comprising:
an in-vehicle equipment for installation in a vehicle;
a portable communication terminal configured to communicate with the in-vehicle equipment; and
a server apparatus configured to communicate with the portable communication terminal, wherein
the portable communication terminal includes:
    a request unit that transmits a request signal requesting voice data representing an email message, to the server apparatus when the portable communication terminal receives an email that has been sent to the portable communication terminal; and
    a transmission unit that transmits the voice data received from the server apparatus, to the in-vehicle equipment,
the server apparatus includes:
    a converter that converts the email message sent to the portable communication terminal, into the voice data in response to the request signal received from the portable communication terminal; and
    a return unit that returns the voice data to the portable communication terminal, and
the in-vehicle equipment includes:
    a voice output unit that outputs a voice message converted from the voice data received from the portable communication terminal, inside a cabin of the vehicle;
    a detector that detects a position of the portable communication terminal in the cabin; and
    a permission unit that permits outputting of the voice message converted only from the voice data representing the email message received by the portable communication terminal located in a specific position in the cabin.

2. The data communication system of claim 1, wherein the specific position is one of a plurality of predetermined areas inside the cabin of the vehicle.

3. The data communication system of claim 2, wherein a user sets one of the plurality of predetermined areas to be the specific position.

4. The data communication system of claim 1, wherein the specific position is a driver's seat area of the vehicle.

5. An in-vehicle equipment for installation in a vehicle, comprising:
an obtaining unit that obtains voice data representing an email message received by a portable communication terminal located in a cabin of the vehicle;
a voice output unit that outputs a voice message converted from the voice data, inside the cabin of the vehicle;
a detector that detects a position of the portable communication terminal in the cabin of the vehicle; and
a permission unit that permits outputting of the voice message converted only from the voice data representing the email message received by the portable communication terminal located in a specific position in the cabin.

6. The in-vehicle equipment for installation in a vehicle according to claim 5, wherein the specific position is one of a plurality of predetermined areas inside the cabin of the vehicle.

7. The in-vehicle equipment for installation in a vehicle according to claim 6, wherein a user sets one of the plurality of predetermined areas to be the specific position.

8. The in-vehicle equipment for installation in a vehicle according to claim 5, wherein the specific position is a driver's seat area of the vehicle.

9. A data communication method used amongst an in-vehicle equipment for installation in a vehicle, a portable communication terminal configured to communicate with the in-vehicle equipment, and a server apparatus configured to communicate with the portable communication terminal, the data communication method comprising the steps of:
    (a) the portable communication terminal transmitting a request signal that requests voice data representing an email message, to the server apparatus when the portable communication terminal receives an email that has been sent to the portable communication terminal;
    (b) the server apparatus converting the email message sent to the portable communication terminal, into the voice data in response to the request signal received from the portable communication terminal;
    (c) the server apparatus returning the voice data to the portable communication terminal;
    (d) the portable communication terminal transmitting the voice data received from the server apparatus, to the in-vehicle equipment;
    (e) the in-vehicle equipment outputting a voice message converted from the voice data received from the portable communication terminal, inside a cabin of the vehicle;
    (f) the in-vehicle equipment detecting a position of the portable communication terminal in the cabin of the vehicle; and
    (g) the in-vehicle equipment permitting outputting of the voice message converted only from the voice data representing the email message received by the portable communication terminal located in a specific position in the cabin.

10. The data communication method according to claim 9, wherein the specific position is one of a plurality of predetermined areas inside the cabin of the vehicle.

11. The data communication method according to claim 10, wherein a user sets one of the plurality of predetermined areas to be the specific position.

12. The data communication method according to claim 9, wherein the specific position is a driver's seat area of the vehicle.

13. A data communication method used in an in-vehicle equipment for installation in a vehicle, the data communication method comprising the steps of:
    (a) obtaining voice data representing an email message received by a portable communication terminal located in a cabin of the vehicle;

(b) outputting a voice message converted from the voice data, inside the cabin of the vehicle;
(c) detecting a position of the portable communication terminal in the vehicle; and
(d) permitting outputting of the voice message converted only from the voice data representing the email message received by the portable communication terminal located in a specific position in the cabin.

14. The data communication method of claim 13, wherein the specific position is one of a plurality of predetermined areas inside the cabin of the vehicle.

15. The data communication method of claim 14, wherein a user sets one of the plurality of predetermined areas to be the specific position.

16. The data communication method of claim 13, wherein the specific position is a driver's seat area of the vehicle.

17. A non-transitory computer-readable recording medium that stores a program to be executed by a computer included in an in-vehicle equipment for installation in a vehicle, the program allowing the computer to execute the steps of:

(a) obtaining voice data representing an email message received by a portable communication terminal located in a cabin of the vehicle;
(b) outputting a voice message converted from the voice data, inside the cabin of the vehicle;
(c) detecting a position of the portable communication terminal in the cabin of the vehicle; and
(d) permitting outputting of the voice message converted only from the voice data representing the email message received by the portable communication terminal located in a specific position in the cabin.

18. The non-transitory computer-readable medium of claim 17, wherein the specific position is one of a plurality of predetermined areas inside the cabin of the vehicle.

19. The non-transitory computer-readable medium of claim 18, wherein a user sets one of the plurality of predetermined areas to be the specific position.

20. The non-transitory computer-readable medium of claim 17, wherein the specific position is a driver's seat area of the vehicle.

* * * * *